US009928168B2

(12) United States Patent
Molloy et al.

(10) Patent No.: US 9,928,168 B2
(45) Date of Patent: Mar. 27, 2018

(54) NON-VOLATILE RANDOM ACCESS SYSTEM MEMORY WITH DRAM PROGRAM CACHING

(71) Applicant: QUALCOMM INCORPORATED, San Diego, CA (US)

(72) Inventors: Stephen Molloy, Carlsbad, CA (US); Dexter Tamio Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 14/993,045

(22) Filed: Jan. 11, 2016

(65) Prior Publication Data

US 2017/0199814 A1    Jul. 13, 2017

(51) Int. Cl.
| | | |
|---|---|---|
| G06F 12/06 | (2006.01) | |
| G06F 12/0804 | (2016.01) | |
| G06F 12/0862 | (2016.01) | |
| G06F 12/0868 | (2016.01) | |
| G06F 12/0893 | (2016.01) | |
| G06F 12/0891 | (2016.01) | |
| G06F 12/0875 | (2016.01) | |
| G06F 12/0866 | (2016.01) | |

(52) U.S. Cl.
CPC ...... *G06F 12/0638* (2013.01); *G06F 12/0804* (2013.01); *G06F 12/0862* (2013.01); *G06F 12/0866* (2013.01); *G06F 12/0868* (2013.01); *G06F 12/0875* (2013.01); *G06F 12/0891* (2013.01); *G06F 12/0893* (2013.01); *G06F 2212/1032* (2013.01); *G06F 2212/205* (2013.01); *G06F 2212/214* (2013.01); *G06F 2212/281* (2013.01); *G06F 2212/305* (2013.01); *G06F 2212/3042* (2013.01)

(58) Field of Classification Search
None
See application file for complete search history.

(56) References Cited

U.S. PATENT DOCUMENTS

| | | | |
|---|---|---|---|
| 8,209,463 | B2 | 6/2012 | Tzeng |
| 8,719,489 | B2 | 5/2014 | Tzeng |
| 8,738,840 | B2 | 5/2014 | Tzeng |
| 9,147,464 | B1 * | 9/2015 | McKernan ............ G11C 11/409 |
| 2004/0078509 | A1 | 4/2004 | Malueg et al. |

(Continued)

OTHER PUBLICATIONS

Baker, Mary, et al. "Non-volatile memory for fast, reliable file systems." ACM SIGPLAN Notices. vol. 27. No. 9. ACM, 1992.*

(Continued)

*Primary Examiner* — Charles Rones
*Assistant Examiner* — Hewy H Li
(74) *Attorney, Agent, or Firm* — Smith Temple Blaha LLC

(57) ABSTRACT

Systems, methods, and computer programs are disclosed for providing non-volatile system memory with volatile memory program caching. One such method comprises storing an executable program in a non-volatile random access memory. In response to an initial launch of the executable program, the executable program is loaded from the non-volatile random access memory into a volatile memory cache for execution. In response to an initial suspension of the executable program, cache pages corresponding to the executable program are flushed into the non-volatile random access memory.

22 Claims, 12 Drawing Sheets

(56) References Cited

U.S. PATENT DOCUMENTS

| | | | |
|---|---|---|---|
| 2004/0230784 A1* | 11/2004 | Cohen | G06F 9/44521 713/1 |
| 2004/0250147 A1* | 12/2004 | Chang | G06F 1/3203 713/323 |
| 2005/0086551 A1 | 4/2005 | Wirasinghe et al. | |
| 2007/0101077 A1* | 5/2007 | Evanchik | G06F 9/4418 711/162 |
| 2008/0270811 A1* | 10/2008 | Chow | G06F 1/32 713/323 |
| 2010/0299513 A1* | 11/2010 | Ryu | G06F 13/1694 713/2 |
| 2011/0004728 A1 | 1/2011 | Schuette | |
| 2012/0096227 A1* | 4/2012 | Dubrovin | G06F 12/0862 711/137 |
| 2012/0173809 A1* | 7/2012 | Ko | G06F 12/0893 711/105 |
| 2012/0297147 A1 | 11/2012 | Mylly et al. | |
| 2013/0290759 A1* | 10/2013 | Kumar | G06F 1/3275 713/323 |
| 2013/0290760 A1* | 10/2013 | Cooper | G06F 1/32 713/323 |
| 2014/0281151 A1 | 9/2014 | Yu et al. | |
| 2014/0304475 A1 | 10/2014 | Ramanujan et al. | |
| 2014/0344527 A1 | 11/2014 | Kaku et al. | |
| 2015/0293822 A1 | 10/2015 | Chun et al. | |
| 2015/0324120 A1* | 11/2015 | Wu | G06F 3/065 711/103 |
| 2015/0363311 A1* | 12/2015 | Munetoh | G06F 12/0638 711/103 |

OTHER PUBLICATIONS

International Search Report and Written Opinion—PCT/US2016/065986—ISA/EPO—dated Apr. 12, 2017.

* cited by examiner

NON-VOLATILE RANDOM ACCESS SYSTEM MEMORY WITH DRAM PROGRAM CACHING

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.). The SoC may be coupled to one or more volatile memory modules or devices, such as, dynamic random access memory (DRAM) via double data rate (DDR) high-performance data and control interface(s).

DRAM is used as random access memory in many systems because it is fast, reliable, and produced in large quantities. User responsiveness for switching between applications can be degraded when insufficient system memory is available to hold all launched applications. As systems and applications become more complex, the need for larger capacity system memory and the cost of DRAM have led to alternative solutions. One alternative is the use of non-volatile memory devices, such as, NAND flash, which is significantly less costly than DRAM. However, NAND flash is a block device, which means that the granularity of data access is relatively large (e.g., approximately 8-16 Kbyte). Furthermore, NAND read and write speed is much slower than DRAM, making NAND less desirable.

Existing methods to replace RAM using NAND flash include kernel swap. Kernel swap uses a small portion of the system's NAND flash memory as temporary backing. When DRAM availability is low, kernel swap evicts idle 4 Kbyte pages from DRAM and temporarily stores them into NAND flash. If the evicted 4 Kbyte page becomes active, kernel swap copies the page from NAND flash back into DRAM.

A significant issue with the kernel swap approach is that the ratio of swap memory capacity in flash to DRAM capacity must be limited. Relying on too much swap memory can result in poor performance or low reliability caused by flash endurance. Therefore, the memory ratio of flash swap capacity to DRAM capacity may be limited (e.g., no greater than 1:4). For example, a system may employ 4 gigabytes of DRAM and allow 1 gigabyte of flash swap for a total system capacity of 5 gigabytes.

Accordingly, there is a need for improved systems and methods that replace DRAM with lower cost non-volatile memory as system memory.

SUMMARY OF THE DISCLOSURE

Systems, methods, and computer programs are disclosed for providing non-volatile system memory with volatile memory program caching. One such method comprises storing an executable program in a non-volatile random access memory. In response to an initial launch of the executable program, the executable program is loaded from the non-volatile random access memory into a volatile memory cache for execution. In response to an initial suspension of the executable program, cache pages corresponding to the executable program are flushed into the non-volatile random access memory.

Another embodiment is a computer system comprising a non-volatile random access memory (RAM) device for storing an executable program, a volatile memory cache, and a system on chip (SoC). The SoC is electrically coupled to the non-volatile RAM device and the volatile memory cache. The SoC comprises a processor and a memory controller. The memory controller is configured to load the executable program from the non-volatile RAM device into the volatile memory cache in response to an initial launch of the executable program. In response to an initial suspension of the executable program, the memory controller flushes cache pages corresponding to the executable program from the volatile memory cache into the non-volatile RAM device.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
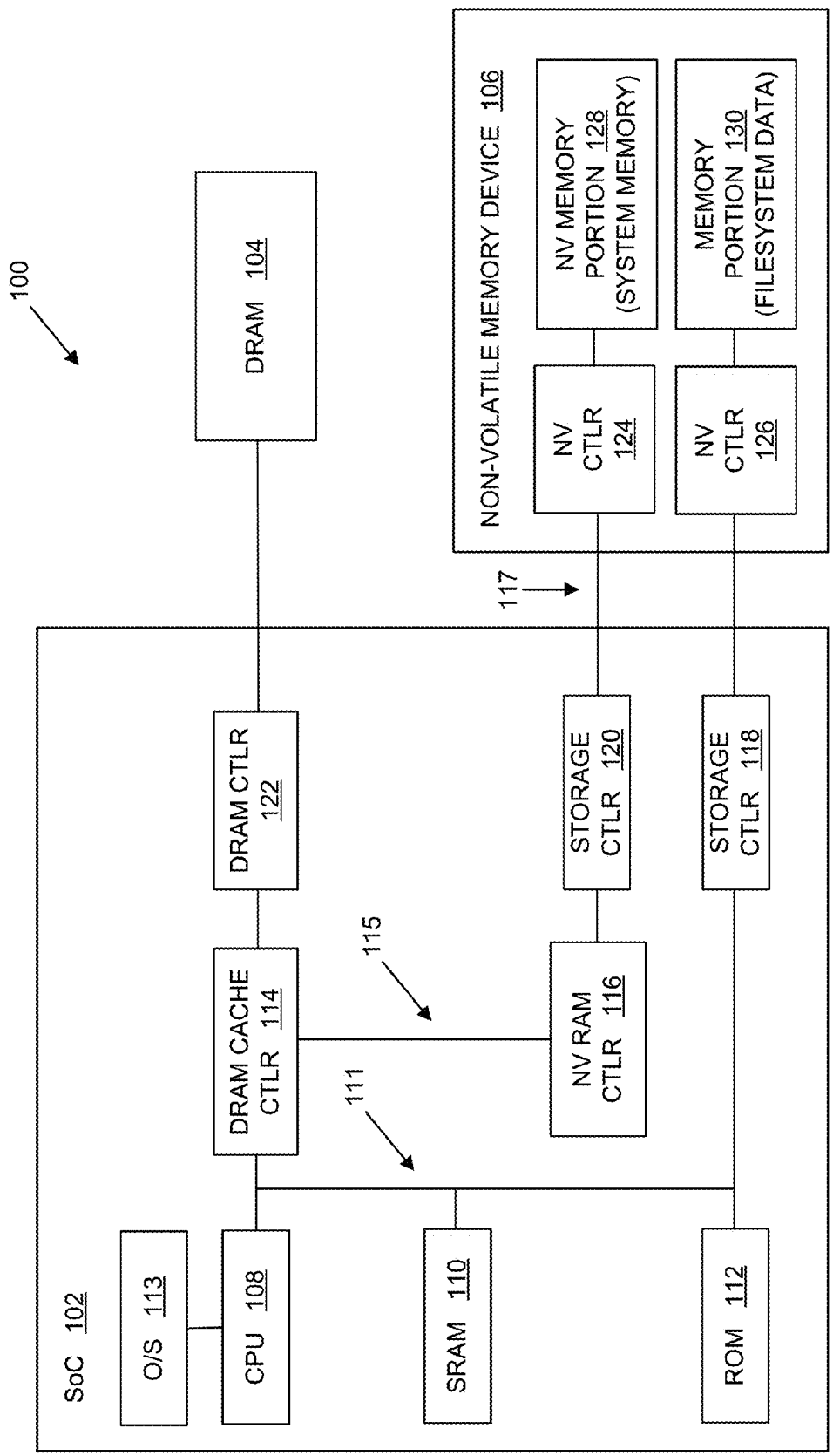
FIG. 1 is a block diagram of an embodiment of a system incorporating non-volatile random access system memory with DRAM caching.

FIG. 1 illustrates an embodiment of a system 100 that uses non-volatile memory as system memory. It should be appreciated that the system 100 may be implemented in any computing device, including a personal computer, a workstation, a server, a portable computing device (PCD), such as a cellular telephone, a smartphone, a portable digital assistant (PDA), a portable game console, a navigation device, a tablet computer, a wearable device, such as a sports watch, a fitness tracking device, etc., or other battery-powered, web-enabled devices.

The system 100 comprises a system on chip (SoC) 102 electrically coupled to one or more volatile memory devices (e.g., dynamic random access memory (DRAM) 104) one or more non-volatile memory devices 106. The non-volatile memory may comprise, for example, a magnetic RAM device, a NAND flash device, a NOR flash device, a resistive RAM device, a phase-change RAM device, a ferroelectric RAM device, or any other non-volatile memory. The non-volatile memory 106 is used as system memory and DRAM 104 is used as cache for the system memory. It should be appreciated that the relatively lower cost non-volatile memory 106 may be used as system memory with a capacity sufficient to maintain all of a user's applications in a launched state, for improved responsiveness, yet without undesirable memory ratio limitations.

The SoC 102 may comprise various on-chip components interconnected via a SoC bus 111. In the embodiment of FIG. 1, the SoC 102 comprises one or more memory clients that request memory resources. The memory clients may comprise one or more processing units (e.g., central processing unit (CPU) 108, a graphics processing unit (GPU), a digital signal processor (DSP), etc.), a video encoder, or other clients requesting read/write access to the memory device(s). The SoC 102 may further comprise on-chip memory, such as, static random access memory (SRAM) 110 and read only memory (ROM) 112.

As further illustrated in FIG. 1, the SoC 102 may comprise various memory controllers for controlling access to the external memory devices. A DRAM controller 122 is electrically coupled to the DRAM 104 via a RAM bus. The DRAM controller 122 is electrically coupled to a DRAM cache controller 114. Storage controllers 120 and 118 are electrically coupled to non-volatile memory device 106. Storage controller 120 is electrically coupled to a non-volatile memory controller 124, via a RAM bus, which controls access to a first portion 128 of non-volatile memory. Storage controller 120 is further coupled to a non-volatile RAM controller 116, which is coupled to a DRAM cache controller 114 via, for example, a DRAM cache bus. Storage controller 118 is electrically coupled to a non-volatile memory controller 126, via a storage bus, which controls access to a second portion 130 of non-volatile memory.

It should be appreciated that non-volatile memory portions 128 and 130 may comprise separate dies of non-volatile memory or separate devices. In the embodiment illustrated in FIGS. 1 and 2, there are two physically separate non-volatile storage devices accessed via a RAM bus and storage bus, respectively. This may provide improved performance by preventing interference between the two storage devices. However, in other embodiments, memory portions 128 and 130 may comprise mutually exclusive dedicated portions of a single device.

Memory portion 128 comprises the physically addressable system memory (i.e., RAM). Memory portion 130 stores the file system data. DRAM cache controller 114 manages the content in DRAM 104, which operates as a cache of the system memory stored in memory portion 128.

Figure 2:
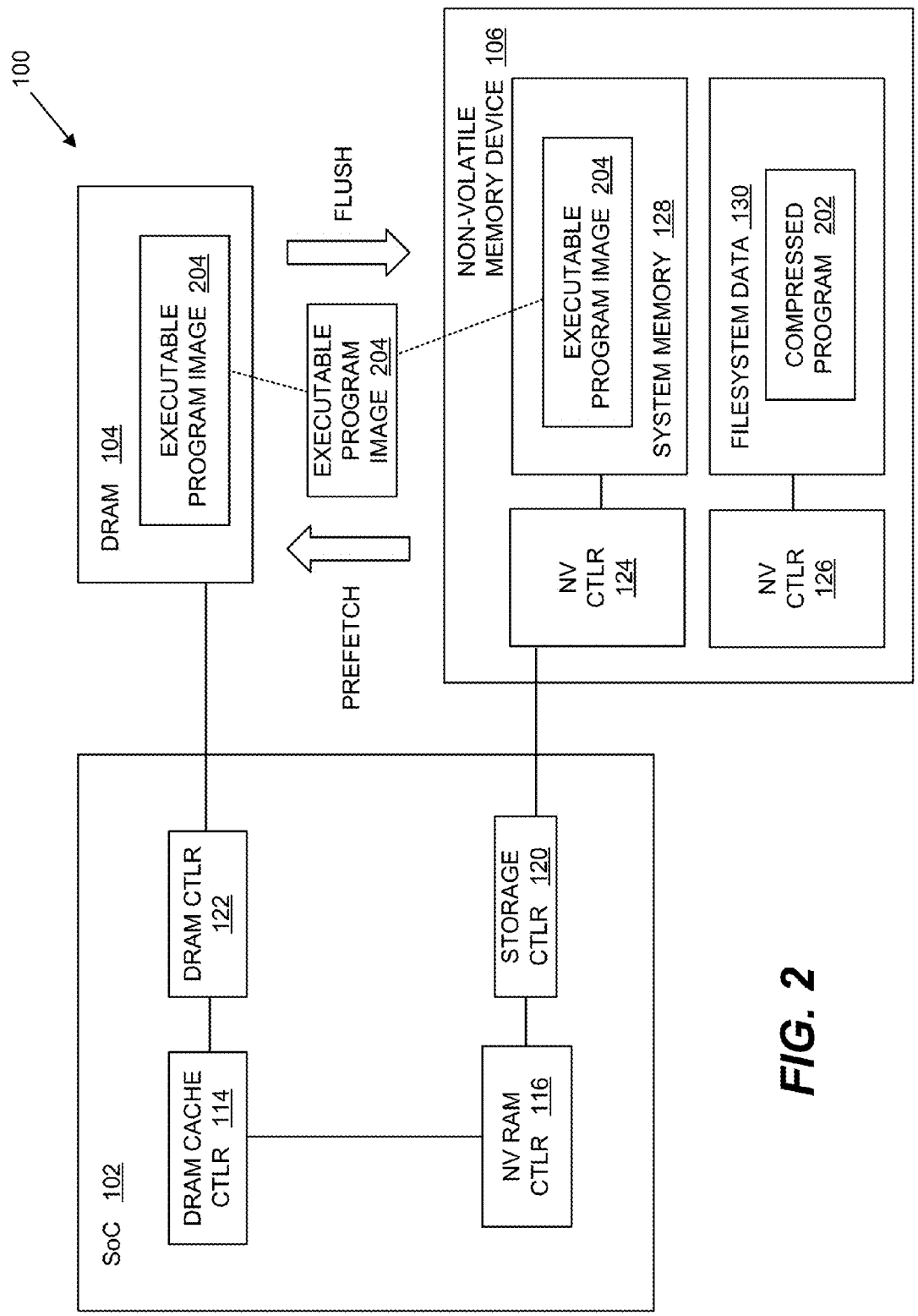
FIG. 2 illustrates an executable program image being prefetched and flushed in the system of FIG. 1.

As illustrated in FIG. 2, applications or programs may be installed and stored in memory portion 130 of non-volatile memory device 106 (e.g., compressed program(s) 202). When the compressed program 202 is initially launched or opened by a user, the program may be decompressed into an executable program image 204 and loaded from memory portion 128 into DRAM 104. In this manner, the system 100 does not execute programs directly from non-volatile memory 106. Instead, they are loaded into a DRAM cache. When a program is paused or suspended, the complete and fully executable program image 204 is available in memory portion 128 of non-volatile memory device 106. When the suspended program is resumed, if it is not resident in DRAM 104, the program is copied from non-volatile memory device 106 to DRAM 104. If a program not currently cached in DRAM 104 needs to resume, the operating system (O/S) 113 may request DRAM cache controller 114 to prefetch the entire program from non-volatile memory portion 128. Non-volatile RAM controller 116 translates the random access request into a block transaction.

Programs not active in the foreground may be paused. When a program is paused, DRAM cache controller 114 may flush any "dirty" cache pages back to memory portion 128 in non-volatile memory device 106. A cache page may become "dirty" when any portion within a page has been modified by an active program and the page no longer exactly matches the corresponding original page in non-volatile system memory 128. For example, non-volatile system memory 128 may comprise the complete program that was initially prefetched into DRAM cache 104 and executed by a processor. During the course of running the program, if the processor makes any changes to the DRAM cache 104, then this change may be made to non-volatile system memory 128. However, rather than continually updating non-volatile system memory 128, it may be more efficient to update when a pause occurs. It should be appreciated that the executable program image 204 may remain resident in DRAM cache 104 while it is paused. As new programs are launched and loaded into DRAM cache 104, DRAM cache controller 114, in an attempt to provide cache space for the new program, may flush all "dirty" pages associated with, for example, a least recently used program to non-volatile memory device 106. Non-dirty pages and read-only pages may be marked unused so they may be re-used by another program.

Figure 3:
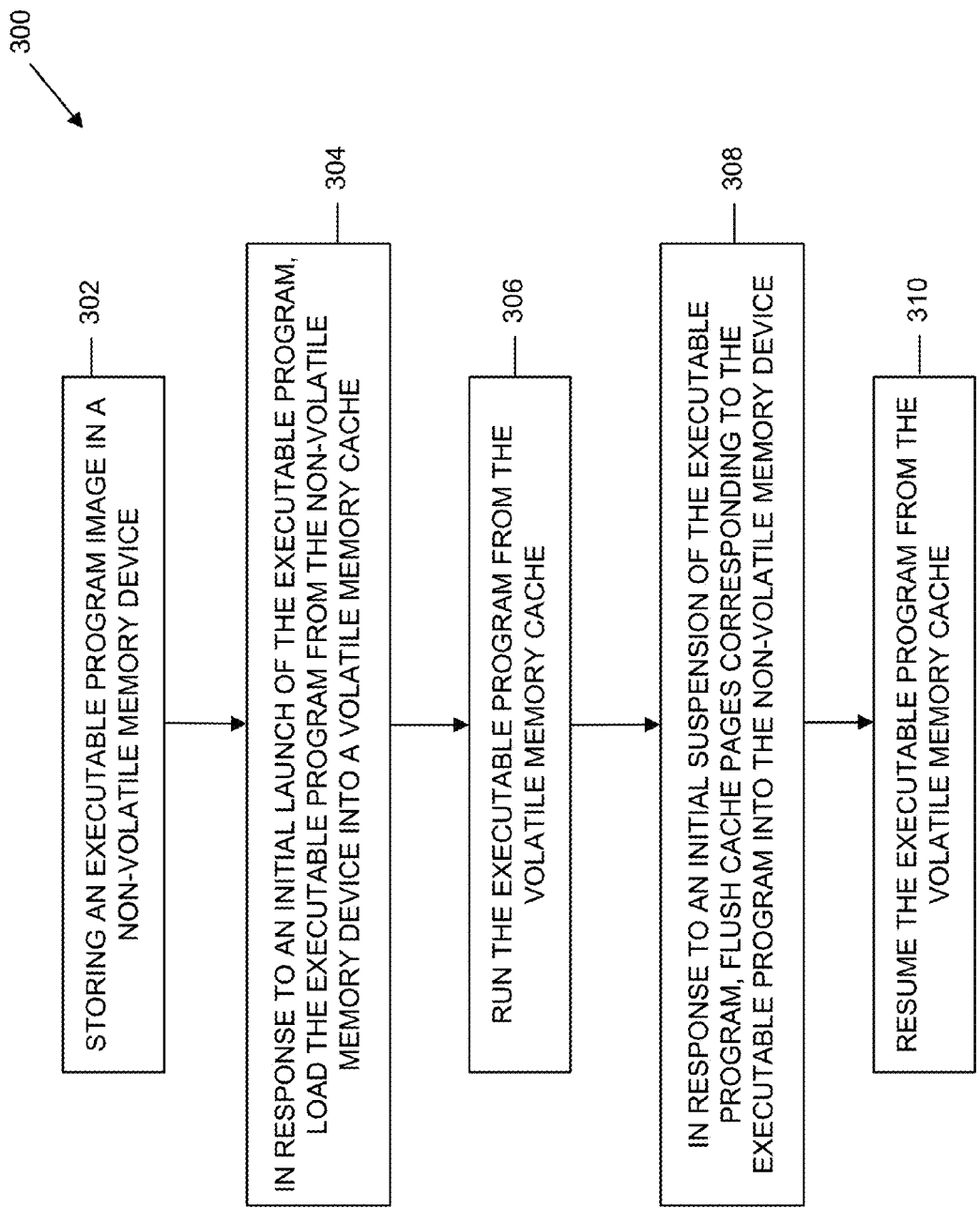
FIG. 3 is a flowchart illustrating an embodiment of a method implemented in the system of FIG. 1 for prefetching and flushing an executable program image between the non-volatile random access system memory and the DRAM cache.

FIG. 3 is a flowchart illustrating an embodiment of a method 300 implemented in the system 100. At block 302, an executable program image 204 may be stored in a memory portion 128 of non-volatile random access memory 106. In response to an initial launch of the executable program 204, at block 304, the executable program 204 may be loaded from non-volatile memory device 106 into DRAM cache 104. At block 306, the executable program 204 is run from DRAM cache 104 instead of the non-volatile system memory 128. In response to an initial suspension of the executable program 204, at block 308, the system 100 may flush all cache pages corresponding to the executable program 204 into the non-volatile memory device 106. At block 310, the suspended executable program 204 may be resumed.

Figure 4:
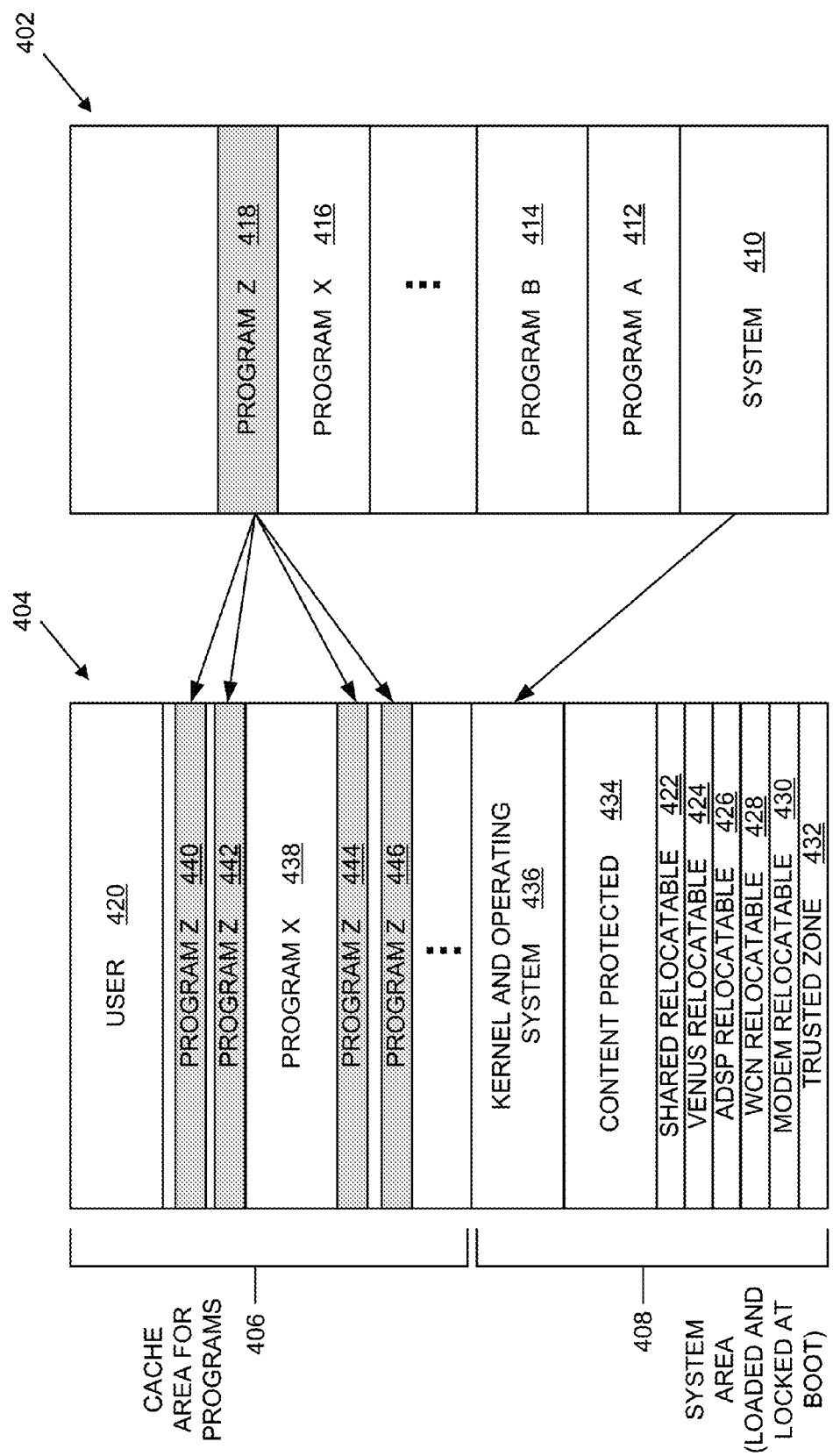
FIG. 4 is data diagram illustrating an embodiment of a DRAM caching structure implemented in the system of FIG. 1.

FIG. 4 is data diagram illustrating an embodiment of a DRAM caching structure implemented in the system 100. During system initialization or boot, a system image may be copied from non-volatile memory device 106 into DRAM 104. Memory map 402 comprises the system memory map for an exemplary non-volatile memory portion 128 within NAND flash device 106. Memory map 404 comprises the memory map for an exemplary DRAM device 104. Memory map 402 comprises portions 412, 414, 416 and 418 corresponding to a program A, a program B, a program X, and a program Z, respectively. Memory map 402 further comprises a portion 410 associated with the system image (e.g., kernel, operating system, drivers, services, libraries, daemons, etc.).

As illustrated in FIG. 4, memory map 404 comprises a cache area 406 and a system area 408. Cache area 406 is for caching programs A, B, X, and Z. A system area 406 is for loading and locking the system image 410 at boot. In the example of FIG. 4, the system area 410 comprises kernel and operating system 436, a content protected area 434, a trusted zone 432, and relocatable code 422, 424, 426, 428, and 430. FIG. 4 illustrates a program Z 418 residing in non-volatile memory 106. When the program Z 418 is initially launched, the program is loaded into DRAM cache 104 for the first run. If the program is not active in the foreground, it may be paused. During a pause/suspend state, programs may continue to reside in DRAM 104. However, the O/S 113 may consider suspended/paused programs more likely for eviction. During a program resume state, programs are copied from non-volatile memory 106 into DRAM 104 by DRAM cache controller 114. If there is insufficient cache space in DRAM 104, then DRAM cache controller 114 notifies O/S 113 which program(s) currently resident in the DRAM cache 104 may be evicted. O/S 113 may use, for example, manual and/or automatic hardware maintenance operations to enable the DRAM cache controller 114 to flush the evictees. In this manner, space in the DRAM 104 may be freed so that newly launched programs can reside there. When a program is forced to stop, the O/S 113 may immediately evict the program from DRAM 104. During low cache memory, when the O/S 113 evicts a program, a portion of the program (i.e., one or more cache pages) that are dirty may be flushed from DRAM 104 to non-volatile memory 106.

Figure 5:
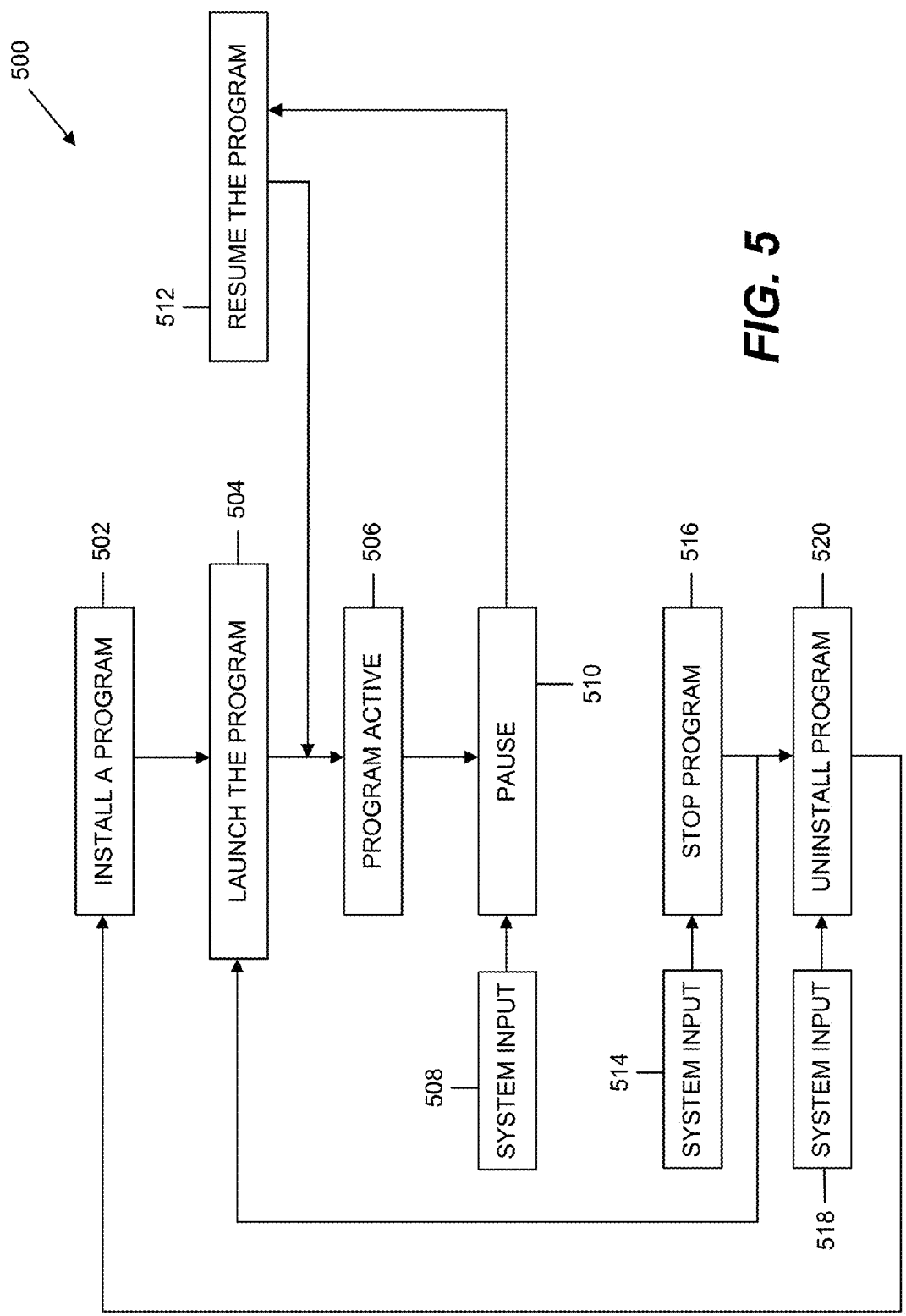
FIG. 5 is a flowchart illustrating an embodiment of state transitions for an exemplary program.

Various operational states of a program in system 100 will be described with reference to FIGS. 5-9. FIG. 5 is a flowchart illustrating an embodiment of state transitions for an exemplary program. Program state 502 refers to a program installed in non-volatile memory device 106 (e.g., compressed program 202—FIG. 2). A program transitions from state 502 to state 504 when the program is opened and launched for the first time. State 506 refers to an active program that has been loaded from non-volatile memory device 106 to DRAM cache 104. In response to a system input 508, an active program may be paused (state 510) and subsequently resumed (state 512). If a program is stopped in response to a system input 514 (state 516), flow returns to state 504. If a program is uninstalled in response to a system input 518 (state 520), flow returns state 502. It should be appreciated that space in DRAM 104 may be freed up when the program is in states 504, 506, 512, and 516. For example, DRAM 104 may be freed up when the program is stopped (state 516), uninstalled (state 520), and/or paused (state 510). FIG. 5 illustrates one of a number of exemplary operational states. In other embodiments, the operational states could be simpler (e.g., the elimination of the stop program state 516) or more complex (e.g., the addition of interim states between pause state 510 and resume state 512 corresponding to different levels of quality, performance, and/or power consumption, depending on the program).

Figure 6:
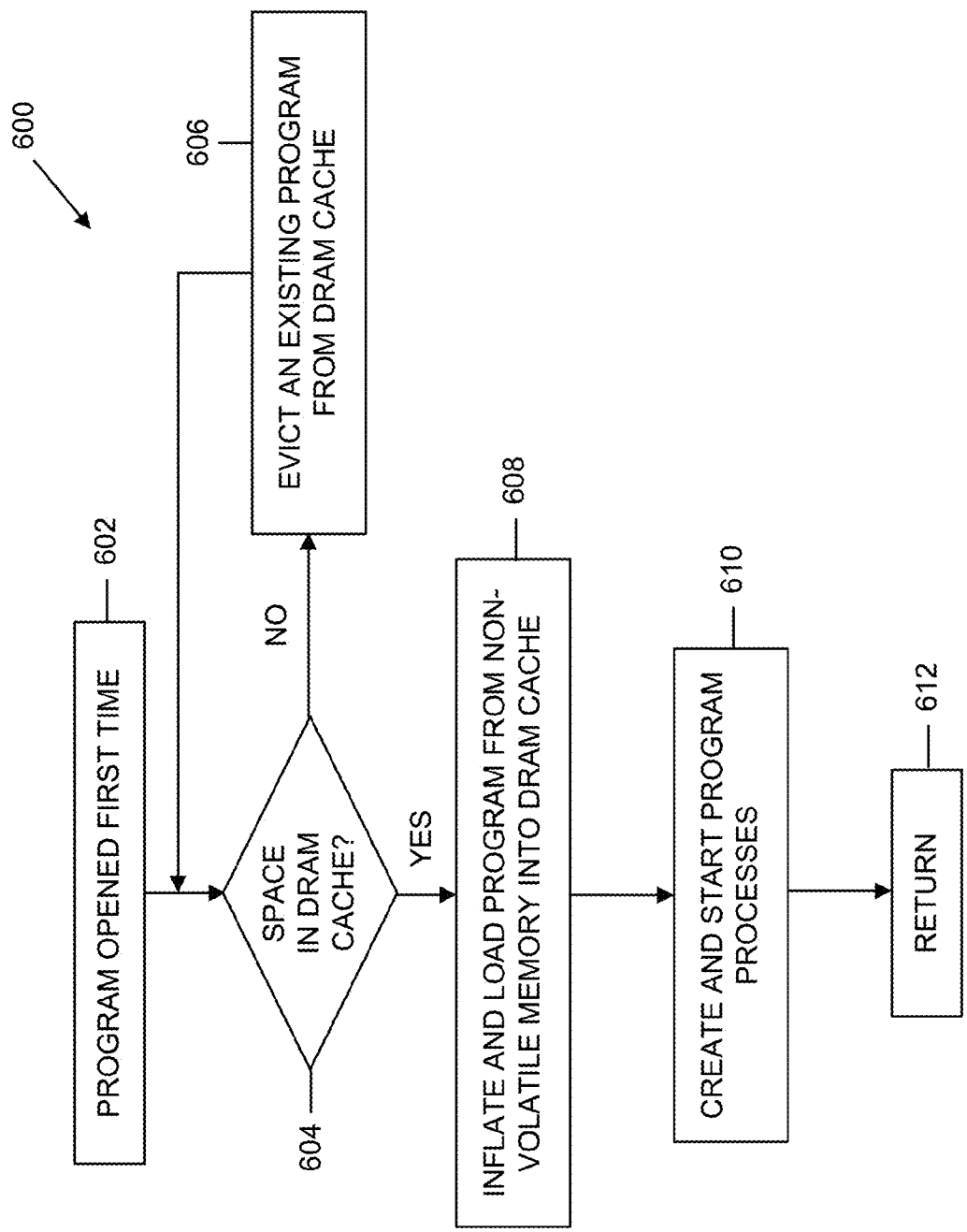
FIG. 6 is a flowchart illustrating an embodiment of method for initially launching a program in the system of FIG. 1.

FIG. 6 is a flowchart illustrating an embodiment of method 600 for initially launching a program in the system 100. At block 602, a program is opened for the first time. If there is not sufficient space in DRAM cache 104 (decision block 604), an existing program may be evicted from DRAM cache 104 at block 606. If there is sufficient space, the program may be decompressed and loaded from non-volatile memory 106 into DRAM cache 104 at block 608. At block 610, the program processes may be created and started.

Figure 7:
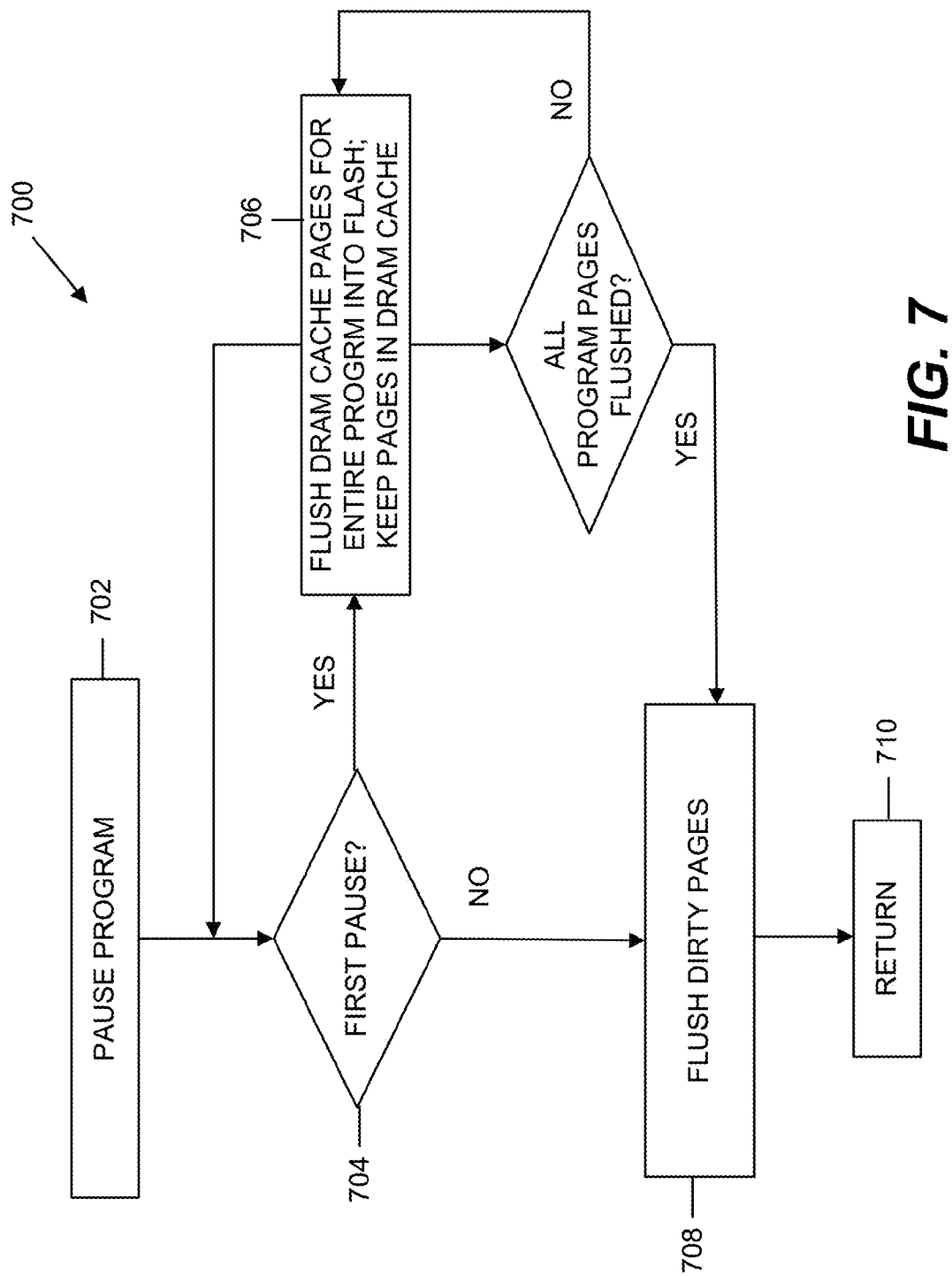
FIG. 7 is a flowchart illustrating an embodiment of method for pausing a program in the system of FIG. 1.

FIG. 7 is a flowchart illustrating an embodiment of method 700 for pausing a program running on DRAM cache 104. At block 702, the pause sequence is initiated. If the pause sequence is the first time a program is being paused (decision block 704), the DRAM cache controller 114 may flush DRAM cache pages for the entire program into non-volatile memory 106 (block 706). The DRAM cache pages may be maintained in DRAM cache 104. If the pause sequence is not the first time a program is being paused, the DRAM cache controller 114 may only flush dirty cache pages (block 708) comprising state-changed program data.

Figure 8:
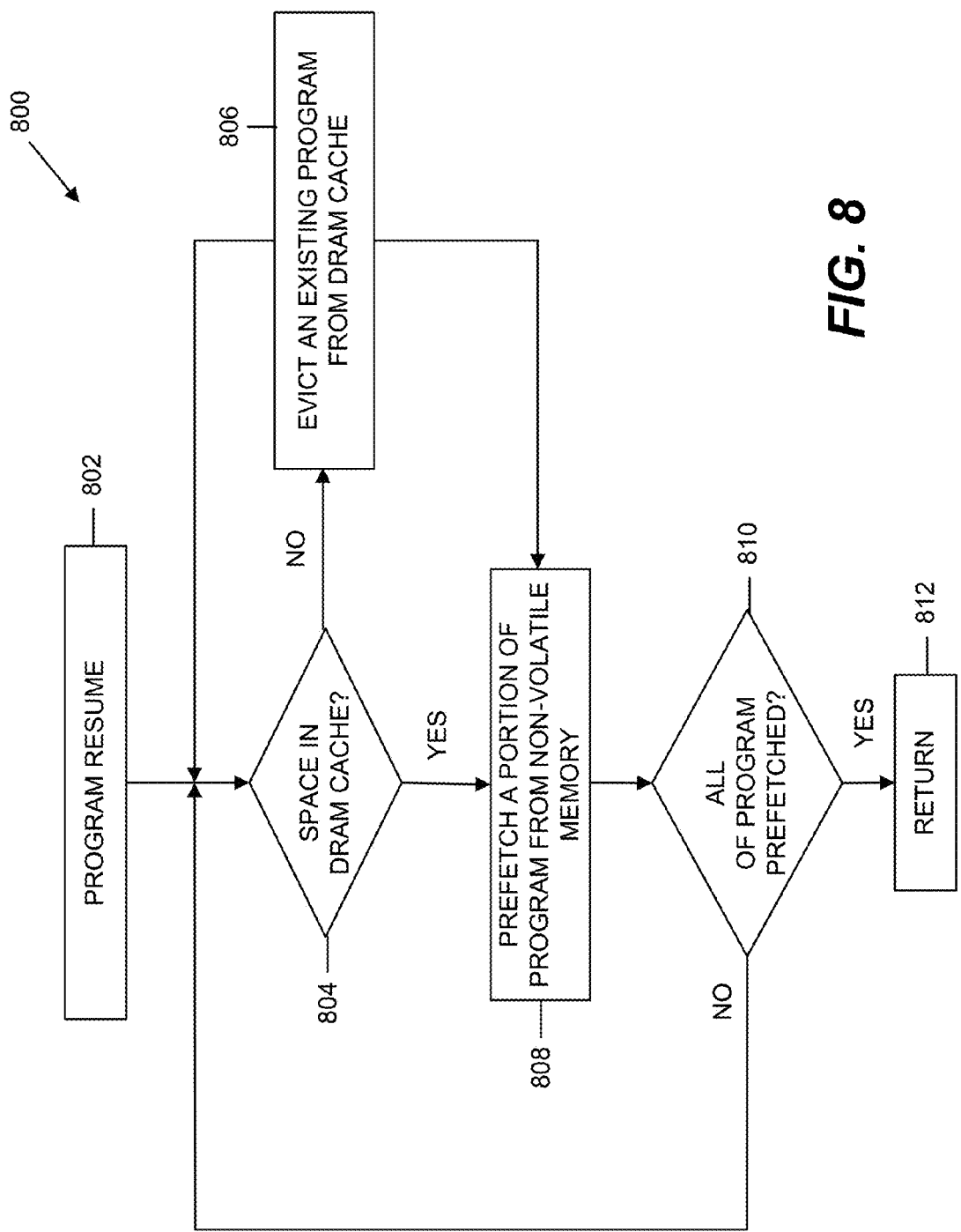
FIG. 8 is a flowchart illustrating an embodiment of method for resuming a paused program in the system of FIG. 1.

FIG. 8 is a flowchart illustrating an embodiment of method 800 for resuming a paused program. At block 802, the resume sequence is initiated. If there is not sufficient space in the DRAM cache 104 (decision block 804), the DRAM cache controller 114 may evict an existing program from DRAM cache 104. If, however, there is sufficient cache capacity, at block 808, the DRAM cache controller 114 may prefetch a portion of the program data from non-volatile memory 106 until the entire program is prefetched. As additional portions are prefetched and more DRAM cache space is needed, further programs may be evicted (block 806).

Figure 9:
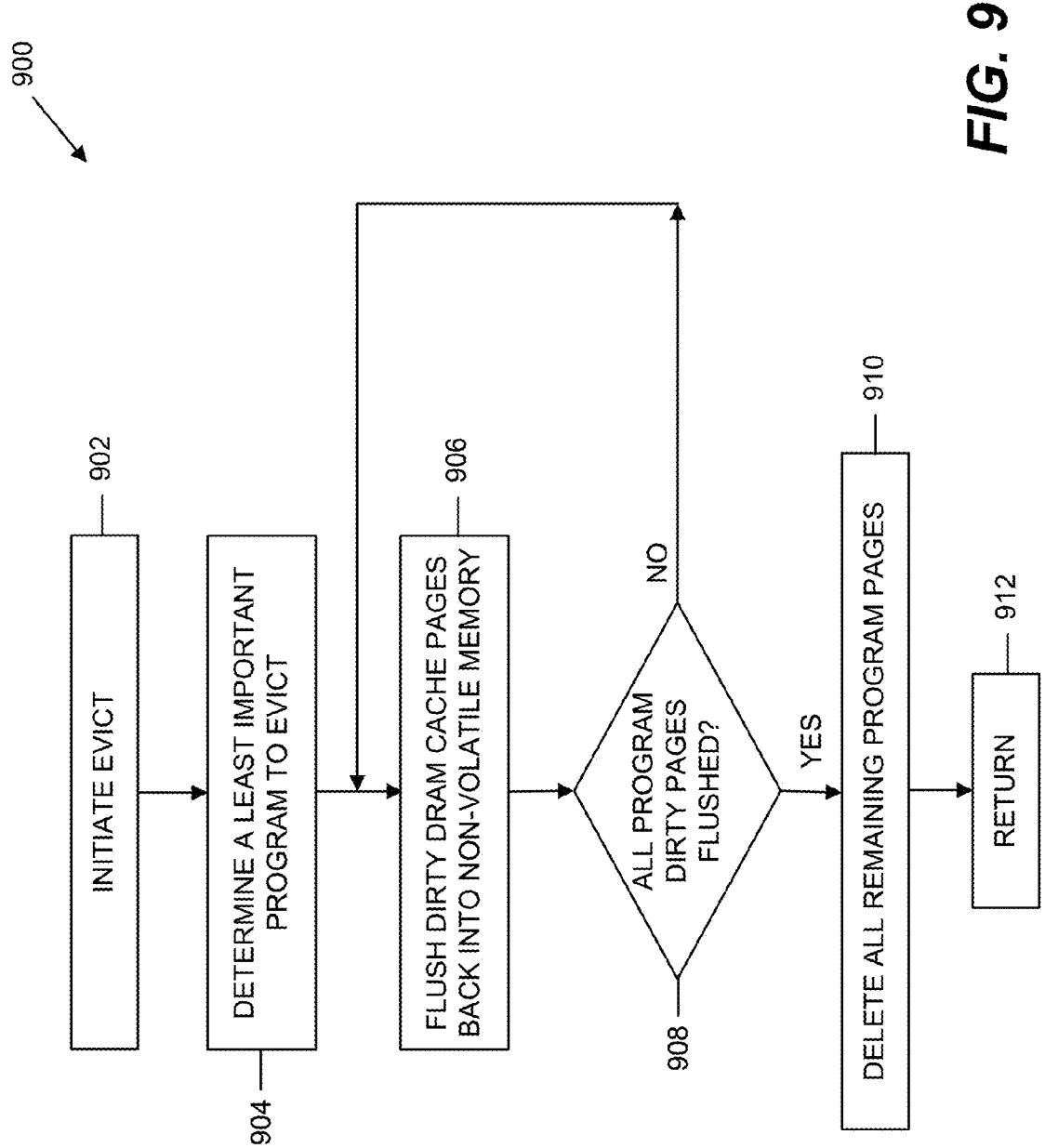
FIG. 9 is a flowchart illustrating an embodiment of method for evicting a program from the DRAM cache.

FIG. 9 is a flowchart illustrating an embodiment of method 900 for evicting a program from the DRAM cache 104. At block 902, the evict sequence is initiated (block 806—FIG. 8). At block 904, the system 100 determines a least important program to evict based on, for example, priority, system usage, application type, etc. At blocks 906 and 908, "dirty" cache pages corresponding to the evicting program are flushed into non-volatile memory. After all "dirty" pages are flushed, all remaining program pages may be deleted from DRAM cache 104 (block 910).

Figure 10:
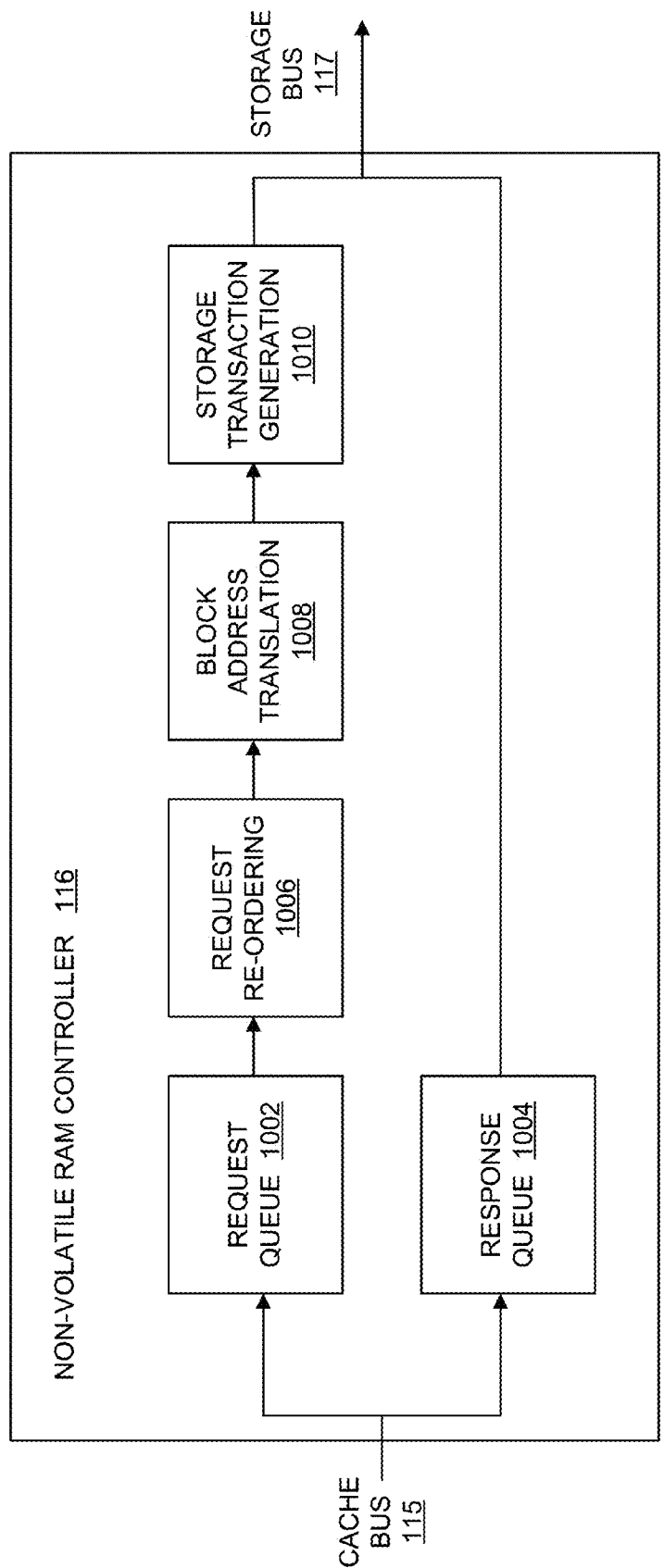
FIG. 10 is a block diagram illustrating an embodiment of the non-volatile RAM controller in the system of FIG. 1.

FIG. 10 is a block diagram illustrating an embodiment of the non-volatile RAM controller 116. In general, the non-volatile RAM controller provides an interface between the cache bus 115 and the storage bus 117 (FIG. 1). Random access reads and writes are received via the cache bus 115 and converted into block transactions to be provided via the storage bus 117 to non-volatile memory controller 124. The DRAM cache controller 114 may issue a sequence of reads from non-volatile memory portion 128 to prefetch a program into the DRAM cache 104 or issue a sequence of writes to flush the DRAM cache 104 into non-volatile memory portion 128 within device 106. Read or write requests may be temporarily stored in a request queue 1002. Individual requests will be serviced immediately. However, because non-volatile memory is flash slower than DRAM, the request queue 1002 may hold multiple requests. A request re-ordering block 1006 may attempt to consolidate requests into the same NAND flash page (e.g., 16 kbytes) or block (e.g., 512 kbytes). The request re-ordering block 1006 may prioritize reads versus writes and/or other transaction characteristics. After reordering, the page starting address and number of pages may be generated in the address translation block 1008. Then, the storage transaction generation block 1010 may build and format a command that will be sent to the storage bus 117. The storage transaction generation block 1010 may also keep track of outstanding transactions to the non-volatile memory device 106. For some types of flash devices, transactions may be multi-queued, allowing multiple outstanding flash transactions. For other types of flash devices, transactions may be single-queued, allowing one outstanding transaction. A response queue 1004 returns control and/or data back to the DRAM cache controller 114. For writes, only an acknowledgement indicating success or fail may be used. For reads, the acknowledgement plus the read data may be returned.

Figure 11:
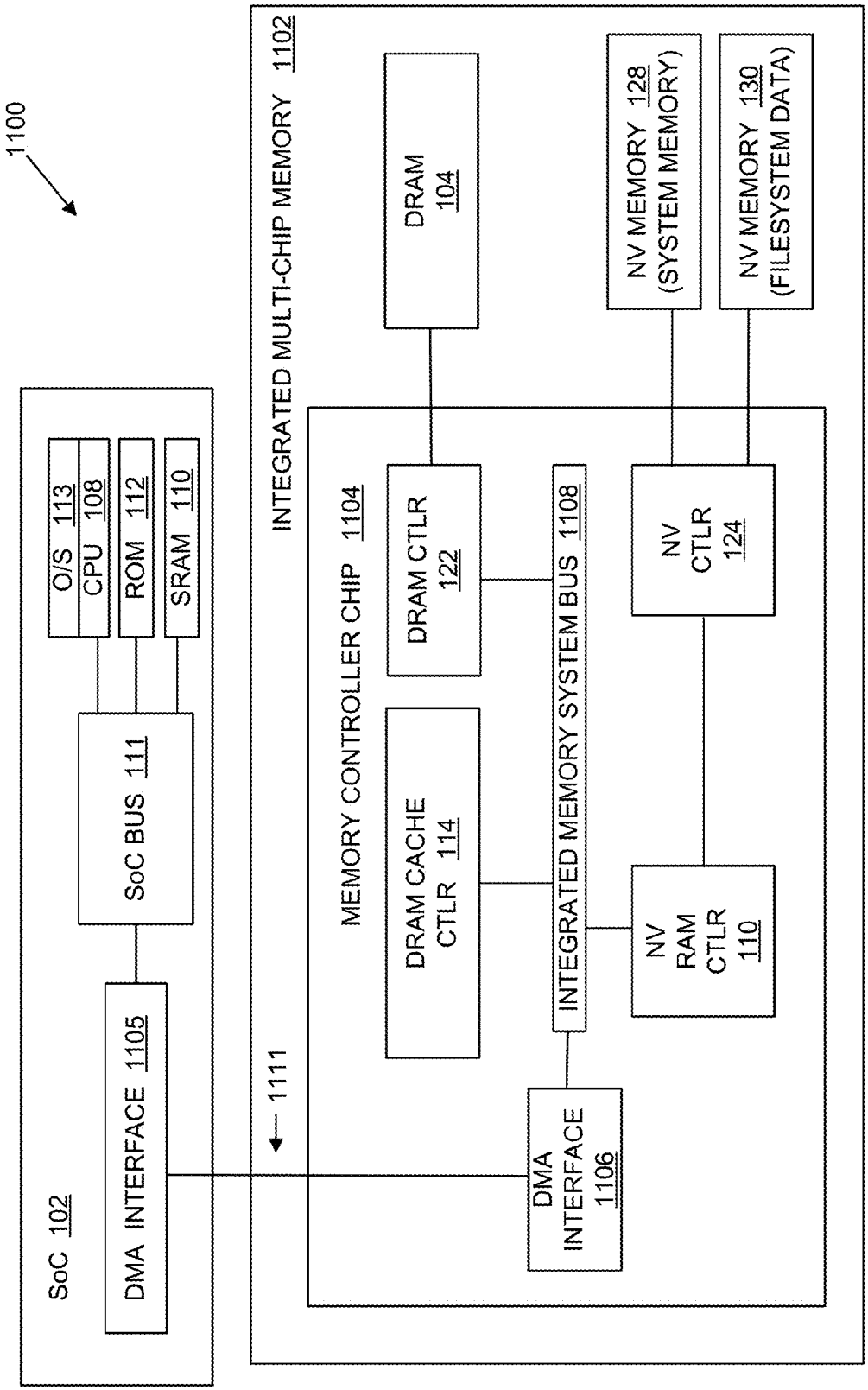
FIG. 11 is a block diagram illustrating another embodiment of a system incorporating non-volatile random access system memory with DRAM caching.

FIG. 11 is a block diagram illustrating another embodiment of a system 1100 incorporating non-volatile random access system memory with DRAM program caching. The SoC 102 uses a single direct memory interface (DMA) bus 1111 to communicate with an external integrated multi-chip memory system 1102. Memory system 1102 comprises DRAM 104, non-volatile memory portions 128 and 130, and a memory controller chip 1104. The memory controller chip 1104 comprises certain functionality previously resident in portions of the SoC 102 in system 100 (FIG. 1). The storage controllers 120 and 118 (FIG. 1) may be eliminated because their role in communication has been replaced by DMA interfaces 1105 and 1106 using DMA bus 1111. Programs may be installed onto memory portion 130 and then first launched and loaded into DRAM 104. After a first pause, the complete and fully executable program image 204 may be written to non-volatile memory portion 128. Programs do not execute directly from non-volatile memory. When resuming, if not already resident, the program may be copied from non-volatile memory portion 128 to DRAM 104. If a program not currently cached in DRAM 104 needs to resume, then O/S 113 (via DMA bus 1111) may request DRAM cache controller 114 to prefetch the entire program from non-volatile memory portion 128 and copy it to DRAM 104. Programs not active in the foreground may be paused, which will flush any dirty pages back to non-volatile memory portion 128 while the program may still reside in the DRAM 104. When there is insufficient DRAM free space to execute a program on CPU 108, DRAM cache controller 114 may flush all dirty pages from DRAM 104 to non-volatile memory 128 corresponding to an entire least recently used program. Non-dirty pages and read-only pages may simply be dropped. SRAM 110 may be used as a temporary workspace for both control and data. DMA bus 1111 may be parallel or serial and implemented with any type of technology to provide high data throughput with low latency.

Figure 12:
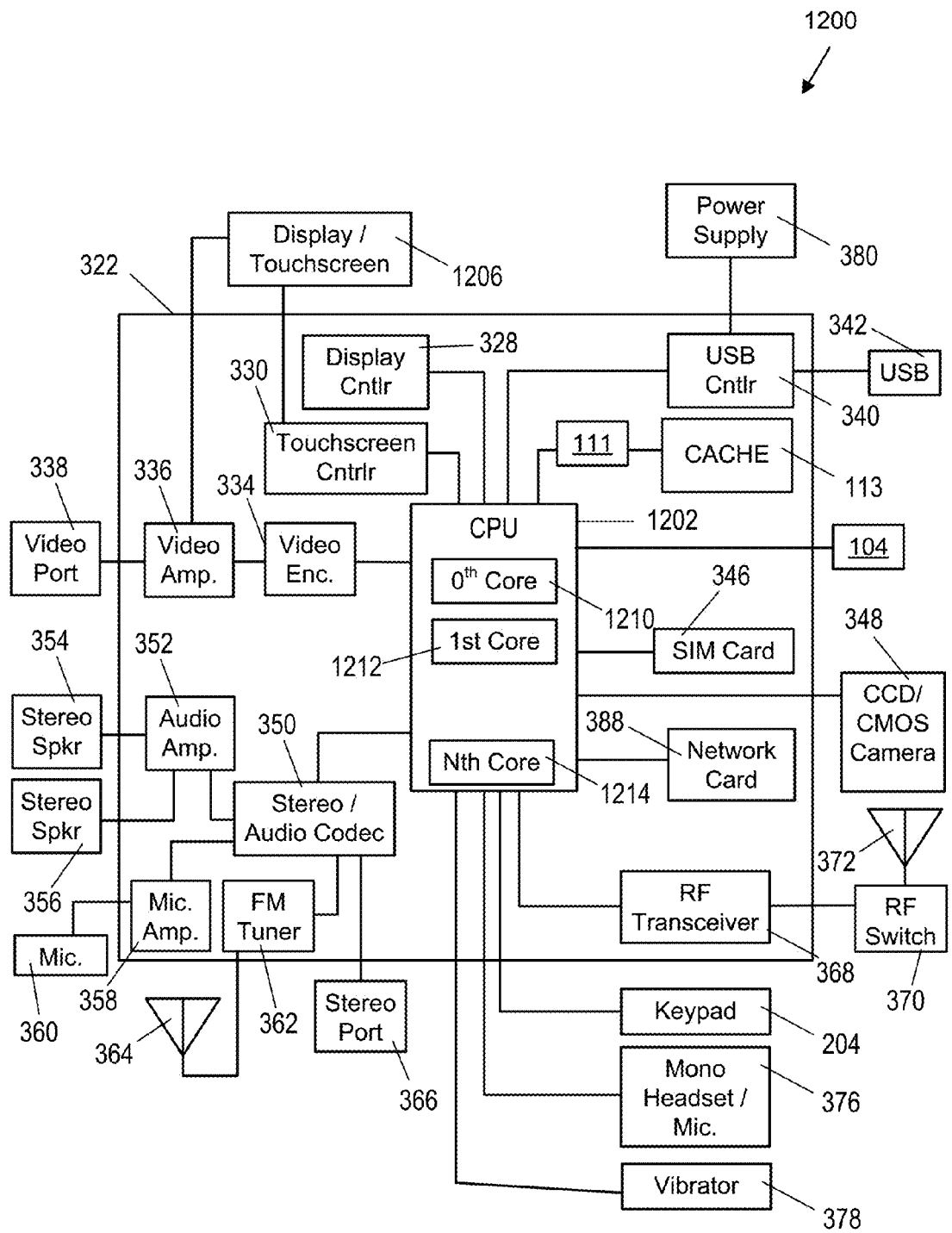
FIG. 12 is a block diagram of an embodiment of a portable communication device for incorporating the system of FIGS. 1 and 11.

As mentioned above, the system 100 may be incorporated into any desirable computing system. FIG. 12 illustrates the system 100 incorporated in an exemplary portable computing device (PCD) 1200. It will be readily appreciated that certain components of the system 100 are included on the SoC 322 while other components (e.g., the DRAM 104) are external components coupled to the SoC 322. The SoC 322 may include a multicore CPU 1202 and other processing units (e.g., a graphics processing unit (GPU), etc.). The multicore CPU 1202 may include a zeroth core 1210, a first core 1212, and an Nth core 1214.

A display controller 328 and a touch screen controller 330 may be coupled to the CPU 1202. In turn, the touch screen display 1206 external to the on-chip system 322 may be coupled to the display controller 328 and the touch screen controller 330

FIG. 12 further shows that a video encoder 334, e.g., a phase alternating line (PAL) encoder, a sequential color a memoire (SECAM) encoder, or a national television system(s) committee (NTSC) encoder, is coupled to the multicore CPU 1202. Further, a video amplifier 336 is coupled to the video encoder 334 and the touch screen display 1206. Also, a video port 338 is coupled to the video amplifier 336. As shown in FIG. 12, a universal serial bus (USB) controller 340 is coupled to the multicore CPU 1202. Also, a USB port 342 is coupled to the USB controller 340. Memory 104 may be coupled to the SoC 322 (as illustrated in FIG. 1).

Further, as shown in FIG. 12, a digital camera 348 may be coupled to the multicore CPU 1202. In an exemplary aspect, the digital camera 348 is a charge-coupled device (CCD) camera or a complementary metal-oxide semiconductor (CMOS) camera.

As further illustrated in FIG. 12, a stereo audio coder-decoder (CODEC) 350 may be coupled to the multicore CPU 1202. Moreover, an audio amplifier 352 may coupled to the stereo audio CODEC 350. In an exemplary aspect, a first stereo speaker 354 and a second stereo speaker 356 are coupled to the audio amplifier 352. FIG. 12 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 12 further illustrates that a radio frequency (RF) transceiver 368 may be coupled to the multicore CPU 1202. An RF switch 370 may be coupled to the RF transceiver 368 and an RF antenna 372. A keypad 204 may be coupled to the multicore CPU 1202. Also, a mono headset with a microphone 376 may be coupled to the multicore CPU 1202. Further, a vibrator device 378 may be coupled to the multicore CPU 1202.

FIG. 12 also shows that a power supply 380 may be coupled to the on-chip system 322. In a particular aspect, the power supply 380 is a direct current (DC) power supply that provides power to the various components of the PCD 1200 that require power. Further, in a particular aspect, the power supply is a rechargeable DC battery or a DC power supply that is derived from an alternating current (AC) to DC transformer that is connected to an AC power source.

FIG. 12 further indicates that the PCD 1200 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 12, the touch screen display 1206, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing non-volatile system memory with volatile memory program caching, the method comprising:
storing an executable application program in compressed form in a non-volatile random access memory;
in response to an initial launch of the executable application program, decompressing and loading the executable application program in its entirety from the non-volatile random access memory into a volatile memory cache;
executing the executable application program from the volatile memory cache;
in response to an initial suspension of the executable application program while one or more other application programs remain active in the volatile memory cache, flushing cache pages corresponding to the executable application program in its entirety in decompressed form into the non-volatile random access memory;
resuming the suspended executable application program following the initial suspension, including copying at least a portion of the executable application program in decompressed form from the non-volatile random access memory into the volatile memory cache before resuming executing the executable application program from the volatile memory cache; and
in response to a subsequent suspension of the executable application program following resuming, flushing only state-changed program data in decompressed form into the non-volatile random access memory.

2. The method of claim 1, wherein the resuming the suspended executable application program comprises:
  determining that the executable application program has been evicted from the volatile memory cache; and
  prefetching the executable application program from the non-volatile random access memory to the volatile memory cache.

3. The method of claim 1, wherein the loading the executable application program from the non-volatile random access memory into the volatile memory cache comprises:
  evicting another executable application program from the volatile memory cache to create free space.

4. The method of claim 1, wherein the volatile memory cache comprises a dynamic random access memory (DRAM) device.

5. The method of claim 1, wherein the non-volatile random access memory comprises one of a magnetic RAM device, a NAND flash device, a NOR flash device, a resistive RAM device, a parameter RAM device, and a ferroelectric RAM device.

6. A system for providing non-volatile system memory with volatile memory program caching, the system comprising:
  means for installing an executable application program in compressed form in a non-volatile memory;
  means for decompressing and loading the executable application program from the non-volatile memory into a volatile memory cache in response to an initial launch of the executable application program;
  means for executing the executable application program from the volatile memory cache;
  means for flushing cache pages corresponding to the executable application program in its entirety in decompressed form into the non-volatile memory in response to an initial suspension of the executable application program while one or more other application programs remain active in the volatile memory cache;
  means for resuming the suspended executable application program following the initial suspension, including means for copying at least a portion of the executable application program in decompressed form from the non-volatile memory into the volatile memory cache before resuming executing the executable application program from the volatile memory cache; and
  means for, in response to a subsequent suspension of the executable application program following resuming, flushing only state-changed program data in decompressed form into the non-volatile memory.

7. The system of claim 6, wherein the means for resuming the suspended executable application program comprises:
  means for determining that the executable application program has been evicted from the volatile memory cache; and
  means for prefetching the executable application program from the non-volatile memory to the volatile memory cache.

8. The system of claim 6, wherein the means for loading the executable application program from the non-volatile memory into the volatile memory cache comprises:
  means for evicting another executable application program from the volatile memory cache to create free space.

9. The system of claim 6, wherein the volatile memory cache comprises a dynamic random access memory (DRAM) device.

10. The system of claim 6, wherein the non-volatile memory comprises one of a magnetic random access memory (RAM) device, a NAND flash device, a NOR flash device, a resistive RAM device, a parameter RAM device, and a ferroelectric RAM device.

11. A computer program embodied in a computer readable medium and executable by a processor for managing a non-volatile system memory with volatile memory program caching, the computer program comprising logic configured to:
  store an executable application program in compressed form in a non-volatile system memory;
  in response to an initial launch of the executable application program, decompress and load the executable application program from the non-volatile system memory into a volatile memory cache;
  execute the executable application program from the volatile memory cache;
  in response to an initial suspension of the executable application program while one or more other application programs remain active in the volatile memory cache, flush cache pages corresponding to the executable application program in its entirety in decompressed form into the non-volatile system memory;
  resume the suspended executable application program following the initial suspension, including copy at least a portion of the executable application program in decompressed form from the non-volatile system memory into the volatile memory cache before resuming executing the executable application program from the volatile memory cache; and
  in response to a subsequent suspension of the executable application program following resuming, flush only state-changed program data in decompressed form into the non-volatile system memory.

12. The computer program of claim 11, wherein the logic configured to resume the suspended executable application program comprises:
  logic configured to determine that the executable application program has been evicted from the volatile memory cache; and
  logic configured to prefetch the executable application program from the non-volatile system memory to the volatile memory cache.

13. The computer program of claim 11, wherein the logic configured to load the executable application program from the non-volatile system memory into the volatile memory cache comprises:
  logic configured to evict another executable application program from the volatile memory cache to create free space.

14. The computer program of claim 11, wherein the volatile memory cache comprises a dynamic random access memory (DRAM) device.

15. The computer program of claim 11, wherein the non-volatile system memory comprises one of a magnetic random access memory (RAM) device, a NAND flash device, a NOR flash device, a resistive RAM device, a parameter RAM device, and a ferroelectric RAM device.

16. A computer system comprising:
  a non-volatile random access memory (RAM) device for storing an executable application program in compressed form;
  a volatile memory cache; and
  a system on chip (SoC) electrically coupled to the non-volatile RAM device and the volatile memory cache, the SoC comprising a processor and a memory controller, the memory controller configured to:

decompress and load the executable application program from the non-volatile RAM device into the volatile memory cache in response to an initial launch of the executable application program;

in response to an initial suspension of the executable application program while one or more other application programs remain active in the volatile memory cache, flush cache pages corresponding to the executable application program in its entirety in decompressed form from the volatile memory cache into the non-volatile RAM device;

resume the suspended executable application program following the initial suspension, including copy at least a portion of the executable application program in decompressed form from the non-volatile RAM device into the volatile memory cache before resuming executing the executable application program from the volatile memory cache; and in response to a subsequent suspension of the executable application program following resuming, flush only state-changed program data in decompressed form into the non-volatile RAM device.

17. The computer system of claim 16, wherein the memory controller resumes the suspended executable application program by:
    determining that the executable application program has been evicted from the volatile memory cache; and
    prefetching the executable application program from the non-volatile RAM device to the volatile memory cache.

18. The computer system of claim 16, wherein the memory controller evicts another executable application program from the volatile memory cache to create free space before loading the executable application program from the non-volatile RAM device.

19. The computer system of claim 16, wherein the volatile memory cache comprises a dynamic random access memory (DRAM) device.

20. The computer system of claim 16, wherein the non-volatile RAM device comprises one of a magnetic RAM device, a NAND flash device, a NOR flash device, a resistive RAM device, a parameter RAM device, and a ferroelectric RAM device.

21. The computer system of claim 16 incorporated in a portable communication device.

22. The computer system of claim 21, wherein the portable communication device comprises one of a smartphone and a tablet computer.

* * * * *